Sept. 28, 1965 R. F. GREGORY ETAL 3,208,547
SEISMIC PROSPECTING

Filed March 29, 1962 2 Sheets-Sheet 1

INVENTORS.
ROBERT F. GREGORY,
CHARLES W. BOGS,
BY John B. Davidson

ATTORNEY.

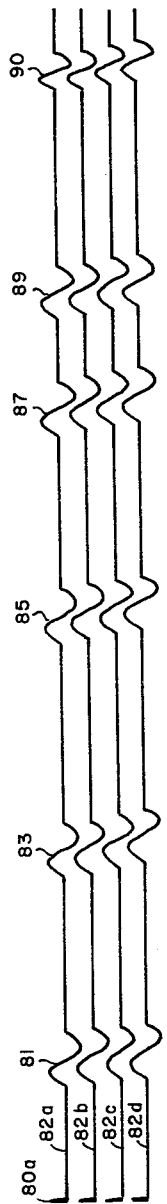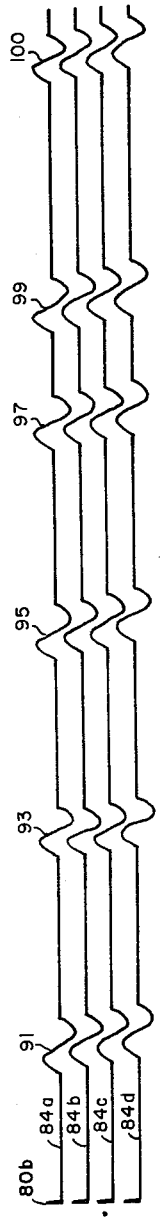

United States Patent Office 3,208,547
Patented Sept. 28, 1965

3,208,547
SEISMIC PROSPECTING
Robert F. Gregory and Charles W. Bogs, Houston, Tex., assignors, by mesne assignments, to Esso Production Research Company, Houston, Tex., a corporation of Delaware
Filed Mar. 29, 1962, Ser. No. 183,653
1 Claim. (Cl. 181—.5)

This invention relates to geophysical prospecting using reflection seismography, and more particularly to reflection seismography techniques for distinguishing between direct and multiple reflections of seismic waves from subterranean reflection horizons.

Reflection seismography is typically accomplished by initiating an artificial seismic impulse at a given point, called a shot point, and detecting the elastic waves reflected from subterranean reflection horizons as a result of the seismic impulse. The artificial seismic impulse may be the result of an explosion of dynamite. Seismic pickup devices, such as geophones, are arranged near the shot point to detect the reflected waves, and the electrical output signals of the geophones are recorded by any of a number of types of recording devices, such as magnetic recorders, galvanometric devices, and the like. The recording normally assumes the form of either a variable density presentation or a "wiggley-trace" presentation. While it is true that direct reflections from subterranean reflecting horizons oftentimes may be readily detected and identified using conventional reflection seismography techniques, more often than not the record of the reflected waves is interfered with by random seismic disturbances, such as those initiated by moving objects in the vicinity or by the wind. Another source of seismic disturbances which can be even more serious than random disturbances is the result of so-called "multiple-reflections" which occur as the result of energy being trapped between two or more earth interfaces so that the seismic waves reverberate back and forth between the interfaces. One of the interfaces may be the earth's surface. The procedures that have been developed to eliminate the deleterious effects of random disturbances are of little value in overcoming the effects on seismic records of multiple-reflections inasmuch as multiple-reflections are not randomly distributed in time. Multiple-reflections are particularly serious if they should happen to reinforce each other so as to set up standing waves between interfaces in the earth. It can be readily understood that identification of primary or direct reflections may become exceedingly difficult, if not impossible, as the result of interference produced by multiple reflections.

Multiple reflections produced by intially-upgoing seismic waves are most apt to produce strongly interfering events on seismograms. The reason is that initially-upgoing waves are strongly reflected both at the earth-air interface and at the bottom of the weathered layer and are most apt to produce standing waves in view of the fact that they have travelled a very short distance through the earth and have been relatively slightly attenuated by the earth. These waves may reflect back and forth between the earth-air interface or the bottom of the weathered layer and an interface not far below the weathered layer. Therefore, it is particularly desirable to eliminate from a seismogram the events produced by initially-upgoing seismic waves.

Probably the most successful technique for eliminating or reducing the effects of multiple reflections produced by initially-upgoing seismic waves is that termed "sequential shooting." According to this technique, explosive charges are vertically spaced apart substantially as given by the formula $$D = D_{s1} - D_{s2} = \frac{V}{4F}$$

where $V$ is the velocity of seismic waves in the vicinity of the charges, and $F$ is the dominant frequency of the seismic waves of interest. Apparatus usually is provided for detonating the lower of the charges when seismic waves produced by the uppermost of the charges reach the lower charge. Often, the initially-upgoing seismic waves will be found to substantially cancel each other, while the initially-downgoing seismic waves often will be found to reinforce each other. In a variation of the technique, the charges are separately detonated to form separate seismograms, and the seismograms are composited after the shallow seismogram has been shifted a distance on its time axis is given by $t_{uh1}-t_{uh2}$, where $t_{uh1}$ and $t_{uh2}$ are the uphole times of the shallow and deep shots, respectively. The general technique is described in the following U.S. patents:

No. 2,808,894—Eisler
No. 2,822,988—Dobrin
No. 2,922,484—Kelly et al.
No. 2,953,214—Merten
No. 3,012,625—Piety In many areas the sequential shooting technique has been found to produce a substantial improvement in seismic records and to diminish or eliminate the deleterious effects of multiple reflections on seismic records. In many other areas, however, the technique is more or less ineffective. The reason for the poor results obtained from sequential shooting in certain areas is believed to be the result of incomplete cancellation of the initially-upgoing waves. Such incomplete cancellation can be the result of distortions produced by reflections from localized reflectors and by interference from seismic waves from other sources. Also, variations in the amplitude of initially-upgoing seismic waves produced by the separate charges may result in incomplete cancellation. This difference in amplitude may be produced by differences in the explosive forces of the charges, differences in the coupling of the charges to the earth, and severe attenuation of the earth's seismic waves in the earth between the seismic charges.

For the purposes of the present specification and the appended claim, the term "seismogram" shall be deemed to mean either the electrical variations produced by seismic detectors responsive to a seismic impulse or reproduced from recorded traces, or a record which contained a multiplicity of traces representative of electrical variations produced by seismic detectors.

In accordance with the teachings of the present invention, seismic impulses are initiated at points in the earth vertically spaced apart a distance given by $$D_{s1} - D_{s2} = \frac{V}{NF}$$

where $V$ and $F$ are as defined above, and $N$ is a whole or fractional number between 4 and 20. Preferably, the spacing is such that $N$ is large. The seismic impulses are spaced apart in time so that separate seismograms are formed from each impulse. The seismic records produced from a given seismic detector responsive to the impulses are simultaneously scanned, and an electrical pulse or other physical indication is produced each time a predetermined condition occurs on the seismic record corresponding to the topmost seismic impulse at a time substantially $t_{uh1}-t_{uh2}$ after it occurs on the seismic record corresponding to the lower seismic impulse, where $t_{uh1}$ and $t_{uh2}$ are the uphole times of the shallow and deep detonations, respectively. Thereafter, a record is formed of the visual representation of the pulses where the visual representations bear a relation to each other which is a function of the time relation between the conditions in the traces which gave rise to the pulses. Following this technique, seismic events produced by multiple-reflections initiated by initially-upgoing seismic waves disappear entirely from the final record, along with most seismic events of random or Gaussian nature.

Objects and features of the invention not apparent from the above discussion will become evident upon consideration of the following detailed description when taken in conjunction with the accompanying drawings, wherein:

FIGS. 6A and 6B are representations of seismic signals useful in understanding the operation of the apparatus of FIG. 5;

Figure 5:
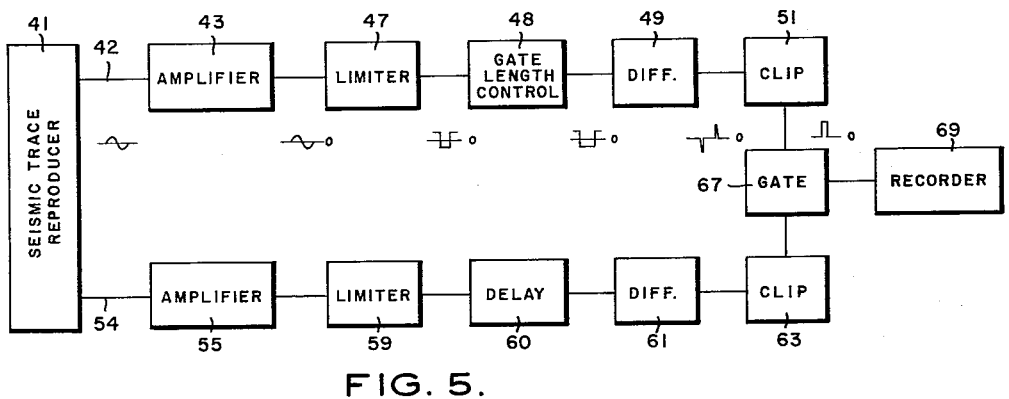
FIG. 5 is a schematic diagram of electrical apparatus suitable for use in practicing the present invention.

FIGS. 7A, 7B, 7C, and 7E are waveform representations of electrical pulse trains on the same time scale that will appear at several points in the circuit of FIG. 5 responsive to the seismic signals of FIGS. 6A and 6B being simultaneously applied thereto;

FIG. 7D is a time chart showing the period during which the gate of FIG. 5 is turned on by pulses illustrated in the pulse train of FIG. 7A;

FIGS. 8A and 8B are simplified multitrace seismograms for the purpose of illustrating the invention and;

FIG. 8C is a variable density record obtained according to the invention from the seismograms of FIGS. 8A and 8B.

Figure 1:
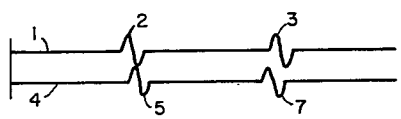
FIG. 1 is a simplified seismogram illustrating the time relationship of events produced both by initially upgoing and initially-downgoing seismic waves utilizing sequential shooting wherein separate seismograms are formed from the individual seismic impulses.

With reference now to FIG. 1, there is shown in simplified form a pair of traces 1 and 4 which may be assumed to have been produced by a geophone responsive to seismic impulses at vertically spaced-apart locations in the earth. The traces do not depict random events such as may be produced by the wind, other seismic sources, and reflections from localized reflectors in the earth, and are meant only to illustrate the sequential shooting technique. Traces 1 and 4 include respectively events 2 and 5 which are indicative of initially-upgoing seismic waves multiply reflected before being detected by the detector. Events 3 and 7 are true reflections produced by initially-downgoing seismic waves singly reflected from a deep reflecting horizon. As the result of so-called "quarter wave spacing" between vertically spaced-apart seismic charges, event 5 is separated from event 2 by $T/4$ on the time scale where T is the period of the wavelets, it being assumed that all of the wavelets have the same period. Likewise, event 7 appears at a time $T/4$ before event 3 appears on its trace. By shifting trace 4 a distance $T/4$ to the right and compositing the two traces, it will be observed that at least a partial cancellation of the events produced by multiple reflections can be achieved, and that the traces produced by singly reflected true reflections will be enhanced.

Figure 2:
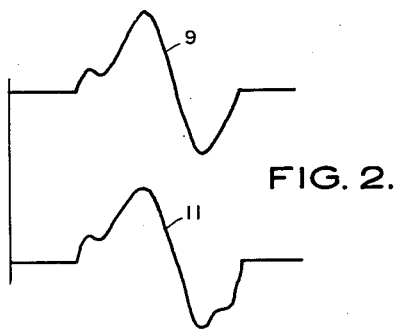
FIG. 2 illustrates wavelets which may be produced by initially-upgoing seismic waves from vertically spaced-apart seismic pulses, which wavelets illustrate distortion that may occur as the wavelets traverse the earth.

The wavelets in FIG. 2 illustrate the type of distortion that can result from interferences by reflections from localized reflectors from interferences resulting from the charges being placed in formations having different transmission characteristics and by interferences from other types of seismic waves. The distortion of the wave shape of initially-upgoing seismic waves will result in incomplete cancellation of the multiply reflected, detected waves at a geophone. If it were assumed that wavelet 9 were produced by an upper seismic charge and that wavelet 11 were produced by a lower seismic charge spaced apart a distance $V/4F$, it is apparent that after shifting the records or otherwise compositing the traces or seismic waves, incomplete cancellation will result such as will produce an interfering lineup on a seismogram.

Figure 3A:
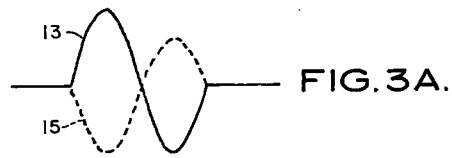
FIG. 3A illustrates wavelets produced by separate seismic charges of different intensity or wherein the coupling between the seismic charges and the earth is sufficiently different to produce wavelets of different amplitudes.
Figure 3B:
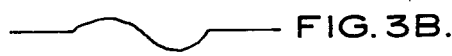
FIG. 3B is a composite wavelet which may be produced when the wavelets of FIG. 3A are in mutually cancelling relationship.

Substantially the same effect as illustrated in FIG. 2 results when, as the result of differences in coupling of explosive forces to the earth, or differences in the attenuation suffered by seismic waves, the seismic waves are of different amplitudes. This is illustrated in FIG. 3A, it being assumed that wavelet 13 is the result of an upper seismic charge, and wavelet 15 the result of a lower seismic charge. A composite wavelet such as illustrated in FIG. 3B would result from the two wavelets of FIG. 3A. Manifestly, this would produce a masking lineup on a seismogram.

Figure 4:
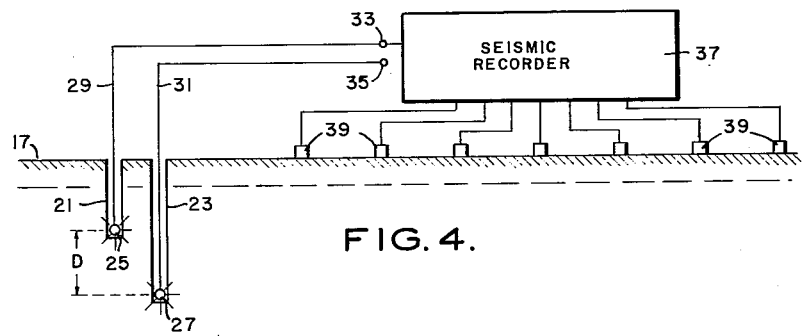
FIG. 4 is a schematic diagram illustrating apparatus for a seismic observation in accordance with the present invention.

With reference now to FIG. 4, there is illustrated a pair of closely spaced shot holes 21 and 23 drilled in the earth from the earth's surface 17 through the weathered layer. While it is preferable to use only one shot hole for reasons of economy, it is perfectly feasible to use two shot holes in sequential shooting as long as the shot holes are very closely spaced. A seismic charge 25 in shot hole 21, and a seismic charge 27 in shot hole 23 are vertically spaced apart a distance given by the relationship $V/NF$. As indicated above, it is preferable that N be between 4 and 20. The larger values of N are preferred. A linear array of geophones 39 is connected to a seismic recorder 37. The geophones in array 39 are illustrated as being disposed on only one side of the shot hole, although it is to be understood that they will be disposed on both sides of the shot hole in the customary manner. The seismic recorder 37 may be of the magnetic recording type such as is manufactured by the Ampex Corporation of Los Angeles, California, wherein is provided an electrical firing circuit for firing seismic charges at the beginning of a recording interval. The firing circuit of seismic recorder 37 is connected to one of electrical terminals 33 and 35, which are respectively connected to caps on seismic charges 25 and 27 by electrical leads 29 and 31. This is in accordance with usual practice and will not be further discussed herein.

Artificial seismic waves produced by the charges 25 and 27 will be detected by the geophone 39 and recorded by recorder 37. The recording interval may be of any convenient duration; usually a recording interval of six seconds is sufficient inasmuch as artificial seismic waves produced by dynamite blasts die out within that time interval, or decay to an amplitude at which they are no longer of interest to geophysicists. Charges 25 and 27 are individually detonated with a time interval between detonations such that seismic waves produced by the first detonated charge will have substantially died out by the time that the second charge is detonated. The seismic charges should not be so sensitive to shock waves as to detonate when waves produced by the other charge impinge thereon.

In FIG. 5 there is shown a seismic trace reproducer 41 which may be of the conventional type wherein two or more traces are individually reproduced on separate channels. Only two output channels 42 and 54 are illustrated in FIG. 5. The signal appearing on output channel 42 will be assumed to be a reproduced trace produced by a given geophone responsive to seismic charge 25, and the signal appearing on channel 54 will be assumed to be reproduced from a trace produced from the same geophone responsive to seismic charge 27. The signal on channel 42 is amplified by amplifier 43. The amplified signal is fed to a limiter 47 which limits the amplitude of the signal applied thereto so as to produce an output signal that is substantially a square wave. The squared signals are fed to gate length control 48 which can increase the width of the square wave. The signals are then differentiated by differentiator 49 to produce sharp spikes at the leading and trailing edges of each squared pulse fed thereto. The spiked signal from differentiator 49 is applied to clipper 51 to eliminate spikes of a given polarity so that the output signal has spikes only of the opposite polarity. The wave shape of the various signals in the chain are as shown under the chain at the various points therein whereat the signal appears. The output pulses from clipper 51 are the control pulses which control the operating state of the electronic gate 67.

The signals from reproducer 41 appearing in channel 54 are applied to a chain of circuit elements including amplifier 55, limiter 59, delay circuit 60, differentiator 61, and clipper 63. Circuit elements including amplifier 55, limiter 59, differentiator 61, and clipper 63 are substantially the same circuit elements as the circuit elements designated by reference numerals 43, 47, 49, and 51. The delay circuit 60 is adapted to delay the signal applied thereto without substantially changing its wave shape. This type of delay is well known in the art and may be an electrical circuit or a magnetic recording and reproducing device having spaced-apart recording and reproducing heads. For reasons that will become apparent below, the delay interval should be adjustable. The output signal from clipper 63 is applied to gate 67 and recorded by recorder 69 over the interval that the gate is open responsive to pulses from clipper 51. The recorder 69 records the pulses in visual, variable density form. Recorder 69 may be of the type described in U.S. Patent No. 2,967,291, or other types well known to the art.

Let it be assumed that as a result of detonation of seismic charges 25 and 27, traces are obtained, portions of which are reproduced as FIGS. 6A and 6B, respectively. The portions of the traces illustrated in FIGS. 6A and 6B will be assumed to be on the same time axis from lined up time breaks (not shown). The events designated by reference numerals 71 and 77 will be assumed to be produced by initially-upgoing, multiply reflected seismic waves, and the event designated by reference numerals 73 and 79 will be assumed to have been produced by initially-downgoing, singly reflected seismic waves. Let it be further assumed that the traces are recorded in reproducible form by recorder 37 and that they are scanned and simultaneously reproduced on channels 42 and 54. The portion of the trace shown in FIG. 6A after having been amplified, limited, shaped, differentiated, and clipped will be as shown in FIG. 7A. In this form it will be applied to gate 67. In FIG. 7D the interval that gate 67 is open responsive to the pulse train shown in FIG. 7A is shown as a plurality of dashed lines. Likewise, the portion of the trace illustrated in FIG. 6B applied to channel 54 will result in an output from clipper 63 having the waveform shown in FIG. 7B. After being delayed by delay circuit 60, the wave train will be as shown in FIG. 7C on the same time scale as FIG. 7A. The delay provided by delay circuit 60 must be substantially the same portion of the period of events 71, 73, 77, and 79 as provided by the delay between the seismic charges 25 and 27 for seismic waves traversing the earth in the vicinity of the seismic charges. In other words, assuming that $N=4$ in the formula for determining the distance between shots 25 and 27, the delay provided by delay circuit 60 will be one-quarter of the period of the reflected and multiply reflected seismic waves.

The operation of the apparatus of FIG. 5 will be best understood by referring to the waveforms of FIGS. 6A, 6B, and 7A through 7D. FIGS. 7A and 7B represent the output pulses obtained from clippers 51 and 63, respectively, assuming that the signals shown in FIGS. 6A and 6B, respectively, were applied to channels 42 and 54. The waveform of FIG. 7C depicts the output pulse train from delay circuit 60 assuming that the delay introduced by delay circuit 60 is one-quarter of the period of the reflections 71, 73, 77, and 79. The pulses in the waveform of FIG. 7C are applied to gate 67. The pulses shown in FIG. 7A control the instants at which gate 67 is opened responsive to each pulse. As indicated above, the duration that gate 67 is opened is controlled by the duration of the output pulse from clipper 51. FIG. 7D represents the duration of opening of gate 67 responsive to the pulses of FIG. 7A on the same time scale as FIGS. 7A and 7B. FIG. 7E represents the output pulses obtained from gate 67 when the pulse train of FIG. 7A and the pulse train of FIG. 7C are fed to the gate. The pulse 77a in the wave train of FIG. 7C is entirely eliminated from the pulse train of FIG. 7E. The pulses 71a and 77a were produced by the multiply-reflected seismic events 71 and 77 appearing in the traces of FIG. 6A and FIG. 6B. However, it will be further noted that pulses 73a and 79a, corresponding to single-reflection events 73 and 79, are brought into time alignment so that an output pulse 79b appears in the output waveform of FIG. 7E. It is also to be noted that a number of other pulses appear in the output waveform as the result of the gate 69 being open when pulses produced by random noise events in the trace of FIG. 6B are applied to the gate during open periods thereof. On a final seismic record such pulses would not produce lineups and would be easily identified as random noise events. However, it is to be noted further that many, in fact most, of the pulses produced by random noise events are eliminated from the pulse train of FIG. 7B, thus simplifying the identification of single reflection events.

In FIGS. 8A and 8B are shown four-trace seismograms that will be assumed to have been obtained by detonation of charges 25 and 27, respectively. Both seismograms are shown in simplified form without noise and other random events that would confuse the display. The seismogram of FIG. 8A contains reflection lineups 81, 83, 85, 87, 89, and 90, and the traces of the seismogram of FIG. 8B contain lineups of reflection events which are designated by reference numerals 91, 93, 95, 97, 99, and 100. The lineups designated by reference numerals 81, 83, 90, 91, 93, and 100 can be seen to have been produced by initially-upgoing multiply-reflected seismic waves by inspecting the relative positions thereof on the time axis of the seismograms. Both seismograms have the same time axis with shot breaks 80a and 80b aligned. Assume now that the seismograms are reproduced simultaneously and that the traces of the seismogram of FIG. 8A are used to gate the traces of FIG. 8B in the manner described above. In other words, assume that trace 82a is applied to a channel corresponding to channel 42, and that trace 84a is applied to a channel corresponding to channel 54, and that the other traces of the seismograms are similarly applied to apparatus as depicted in FIG. 5 so that traces 82b, 82c, and 82d are used to produce pulses that gate pulses obtained from traces 84b, 84c, and 84d, respectively. A seismogram as shown in FIG. 8C will be obtained wherein there will be no events corresponding to events 91, 93, and 100. The event lineups 105, 107, and 109 respectively correspond to the lineups 95, 97, and 99 of FIG. 8B. The event lineups 105, 107, and 109 are shown as being presented in variable density form, although it is to be understood that other types of presentations may be utilized. It is apparent from the seismograms of FIGS. 8A, 8B, and 8C that the events on an actual seismogram containing noise as well as reflection events will be considerably cleaned up, and that the identification of reflection events will be substantially facilitated.

It is apparent that many modifications may be effected without departing from the spirit and scope of the invention. For example, instead of detecting amplitude peaks as described above, amplitude peaks may be detected by inserting a differentiator circuit between amplifier 43 and limiter 47, and another differentiator circuit between amplifier 55 and limiter 59. Pulses are thereby produced to form a first pulse train effective to control the gating of gate 67, and a second pulse train to be gated to recorder 69 and reproduced thereby. Furthermore, the seismograms reproduced by reproducer 41 may be manually adjusted or the pick-up heads of the reproducer may be adjusted relative to each other so as to provide the desired time relationship between the traces applied to amplifiers 43 and 55, thereby eliminating the necessity for delay circuit 60. It is apparent, therefore, that certain of the steps set forth above may be performed manually as well as by mechanical and electrical apparatus. Other changes may be made in the arrangement of the steps and apparatus as set forth above without departing from the spirit and scope of the invention.

The objects and features of the invention having been completely described, what we wish to claim is:

In connection with sequential-pulse seismic prospecting wherein a second seismic charge is detonated below a first seismic charge and the charges are vertically spaced apart a distance substantially $V/NF$, where V is the velocity at which vibrations are transmitted through the earth in the region of the charges, and F is the dominant frequency of seismic vibrations to be measured, and wherein N is a number between 4 and 20, and wherein the charges are detonated in sequence with a time interval between successive detonations of sufficient duration for vibrations resulting from the detonation of a previously detonated explosive charge to die out, and wherein earth vibrations resulting from detonation of the explosive charges are detected at a location horizontally spaced apart from the vertically spaced apart explosive charges, the method comprising:

separately forming first and second seismograms from the detected earth vibrations resulting from detonation of said first and second explosive charges respectively;

simultaneously scanning the seismograms to produce first and second electrical signals representative thereof;

detecting the instant at which each of said electrical signals changes from one amplitude to the opposite amplitude to produce first and second pulse trains corresponding to said first and second electrical signals;

opening an electrical gate for a time interval of predetermined duration responsive to each pulse in said first pulse train;

applying said second pulse train to said electrical gate for gating thereby; and recording the pulses of said second pulse train passed by the electrical gate.

References Cited by the Examiner

UNITED STATES PATENTS

| | | | |
|---|---|---|---|
| 2,634,398 | 4/53 | Piety | 340—15.5 |
| 2,688,124 | 8/54 | Doty et al. | 340—15.5 |
| 2,972,733 | 2/61 | Bucy | 340—15.5 |
| 3,012,625 | 12/61 | Piety | 181—.5 |

SAMUEL FEINBERG, *Primary Examiner.*

CHESTER L. JUSTUS, *Examiner.*